(12) United States Patent  
Moore

(10) Patent No.: US 8,478,927 B2  
(45) Date of Patent: Jul. 2, 2013

(54) USB HUB SUPPORTING UNEQUAL NUMBERS OF HIGH-SPEED AND SUPER-SPEED PORTS

(75) Inventor: Terrill M. Moore, Trumansburg, NY (US)

(73) Assignee: MCCI Corporation, Ithaca, NY (US)

( * ) Notice: Subject to any disclaimer, the term of this patent is extended or adjusted under 35 U.S.C. 154(b) by 73 days.

(21) Appl. No.: 13/280,580

(22) Filed: Oct. 25, 2011

(65) Prior Publication Data

US 2012/0102255 A1  Apr. 26, 2012

Related U.S. Application Data

(60) Provisional application No. 61/406,427, filed on Oct. 25, 2010.

(51) Int. Cl.  
*G06F 13/20* (2006.01)

(52) U.S. Cl.  
USPC ............................................. 710/313; 710/62

(58) Field of Classification Search  
USPC ...................... 710/311–313, 62, 58  
See application file for complete search history.

(56) References Cited

U.S. PATENT DOCUMENTS 7,188,206 B2 *  3/2007  Tung et al. ................. 710/302

FOREIGN PATENT DOCUMENTS

WO  WO 2007/147114 A2  12/2007

OTHER PUBLICATIONS

"Universal Serial Bus Specification, Revision 2.0", Apr. 27, 2000, retrieved from <http://www.perisoft.net/engineer/usb_20.pdf> on Oct. 25, 2011, 650 pages.

"Universal Serial Bus3.0 Specification, Revision 1.0". Nov. 12, 2008, retrieved from <http://www.gaw.ru/pdf/interface/usb/USB%203%200_english.pdf>on Oct. 25, 2011, 482 pages.

"Universal Serial Bus 3.0 Specification Chapter 3-11", Nov. 12, 2008, pp. 41-440, XP55010091, Retrieved from the Internet: URL:www.usb.org.

* cited by examiner

*Primary Examiner* — Clifford Knoll  
(74) *Attorney, Agent, or Firm* — Cesari and McKenna, LLP; Patricia A. Sheehan

(57) ABSTRACT

A super-speed USB3.0 hub is described to which, after configuration, there are more high-speed devices than super-speed devices connected. The difference in the numbers is recognized and logic is provided that responds to an upstream host that there is an equal or balanced number of super-speed and high-speed ports active. This is accomplished by providing a number of "dummy" ports that make up any actual difference. The "dummy" ports are never active and are never connected to any device.

10 Claims, 1 Drawing Sheet

USB HUB SUPPORTING UNEQUAL NUMBERS OF HIGH-SPEED AND SUPER-SPEED PORTS

CROSS-REFERENCE TO RELATED APPLICATIONS

The present application claims the benefit of U.S. Provisional Patent Application Ser. No. 61/406,427, which was filed on Oct. 25, 2010, by Terrill M. Moore for a USB HUB SUPPORTING UNEQUAL NUMBERS OF HIGH-SPEED AND SUPER-SPEED PORTS and is hereby incorporated by reference.

BACKGROUND OF THE INVENTION

Universal Serial Bus (USB) hubs may be found in many computer systems and they generally conform to published specifications. In particular, super-speed USB hubs generally conform to *Universal Serial Bus Specification, Rev.* 3.0, which may be found and downloaded via the Internet. This specification is incorporated by reference into the present application. A hub conforming to this specification is referenced herein as USB3.0hub. Within the USB3.0hub there will be found a super-speed hub (SShub), control logic and a high-speed hub (HShub).

In this application USB3.0hub is located between a HOST computer system, that may be local or remote from the USB3.0hub, and a number of USB ports that connect to USB peripheral devices, e.g. cameras, etc.

Due to package pin limitations, multiplexing timing requirements and/or other reasons, there are often fewer super-speed ports than high-speed ports. However, problems arise since system software expects an equal number or "balance" between the number of high-speed and super-speed ports.

SUMMARY OF THE INVENTION

The present application is directed to a USB system that provides a path communicating with an upstream Host computer system and downstream USB ports, wherein the USB system conforms at least in part to the Universal Serial Bus Specification, revision 3.0. The downstream path comprises a path to USB connectors, each of which may be connected to a USB device.

The present application addresses the issue of balancing the number of high-speed and super-speed ports connected to a USB3.0hub. In a particular example, where there are fewer super-speed ports than high-speed ports, a number of "dummy" super-speed ports may be added to the SShub architecture to meet the balance requirement in the particular example. These "dummy" ports appear to be normal SS ports when viewed from an upstream host, but there will be no physical connections to a downstream connector or a physical super-speed device. The "dummy" ports are not actually active—they'll never report "device attached," and any commands to those "dummy" ports will result in no operation except that "set_feature(port_power)" and "clear_feature (port_power)" commands to any port will turn on/off power to the physical port. To the upstream system software there is a balance between the super-speed and the high-speed ports and the system software will operate consistently across all ports, including the "dummy" ports.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
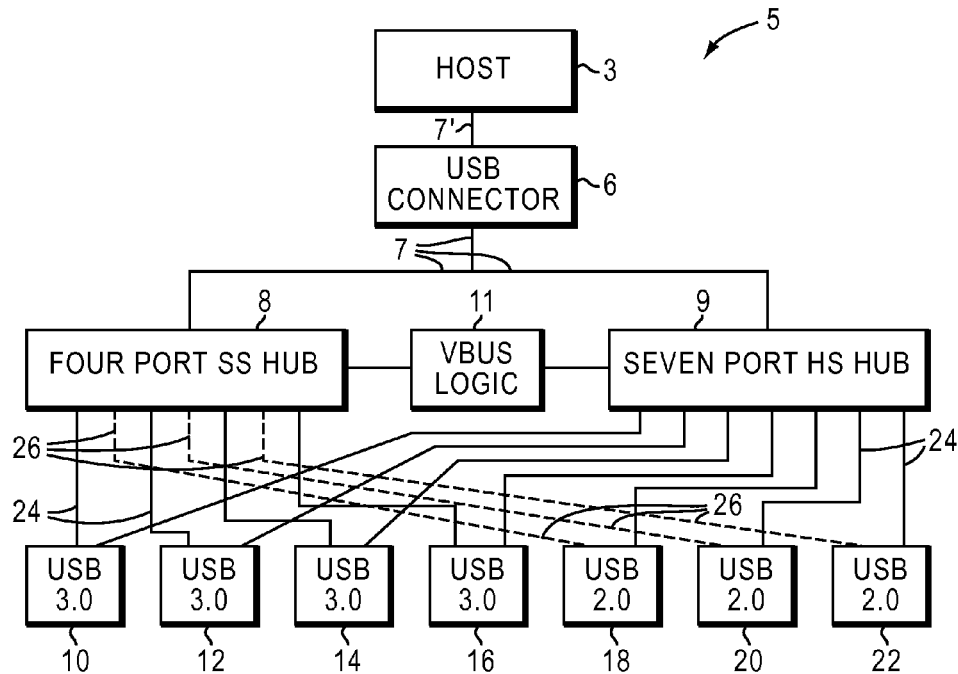
FIG. 1 is block diagram illustrating a particular USB system.

The block diagram of FIG. 1 illustrates a particular USB3. hub 5. A host computer system 3 is located "upstream" and communicates with: an SShub 8 that is connected to four downstream super-speed ports, 10, 12, 14, and 16; and a HShub 9 that is connected to a group of seven high-speed ports 10, 12, 14, 16, 18, 20, and 22. The HShub 9 is configured and operated in a known manner generally conforming to *Universal Serial Bus Specification, Rev.* 2.0. "Communications" herein broadly encompasses, inter alia, control and data information.

A USB connector 6 and cabling 7, 7' joins the host 3 to the SShub 8 and the HShub 9. In this example, the four super-speed and seven high-speed ports are shown, but other numbers may be found in other applications. However, the present application is directed to systems where there are fewer super-speed ports than high-speed ports connected the USB3.0hub.

The VBUS logic 11 operates to control the voltage and inrush current to the SShub 8 and the HShub 9. Note the term "logic" may include hardware, micro-code, software and/or combination thereof.

Some ports (say ports 10, 12, 14 and 16) may be configured as either SS or HS ports, as indicated by the solid lines 24 from the respective hubs. Other ports (say ports 18, 20, and 22) will be fully functional high-speed (but not super-speed) ports and are only connected to the HShub 9. When viewed via the SShub, these ports will appear to be functional and can accept control commands as if the ports were functional, but they never will report "device present". This is indicated in the drawing by the dotted lines 26 from the SShub 8 to ports 18, 20, and 22.

Figure 2:
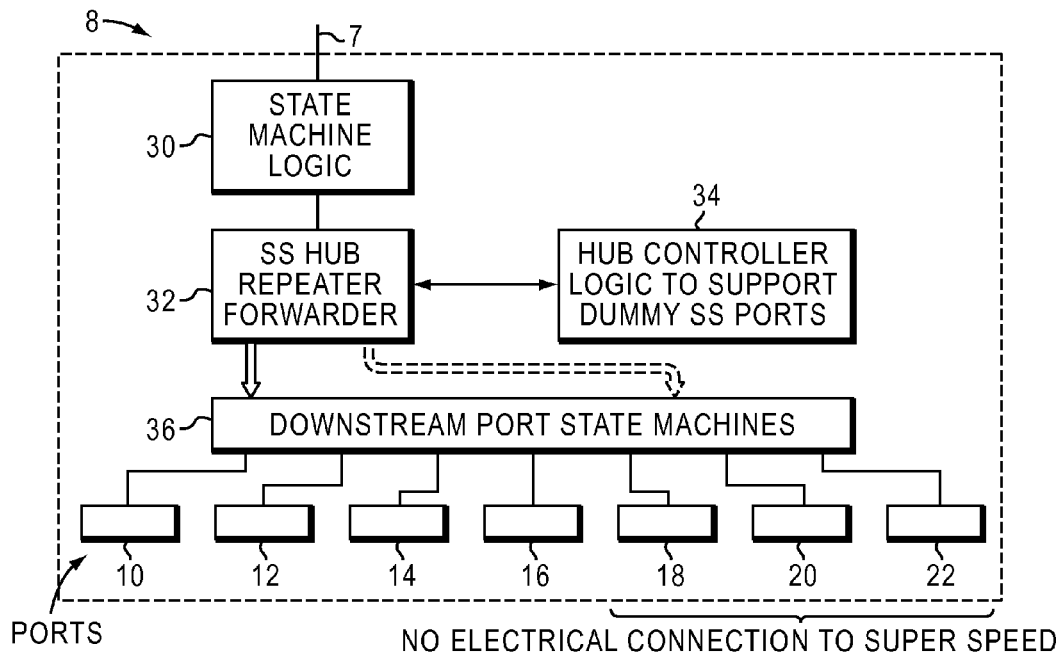
FIG. 2 is a block diagram illustrating an internal logic of the SShub of FIG. 1.

FIG. 2 illustrates some of the functional blocks within the four port SShub 8. A hardware implemented state machine 30 joins the upstream host 3 via the connection 7 (and the USB connector 6).

The SShub repeater/forwarder 32 is responsible for connectivity set-up and tear-down, bus faults and recovery therefrom. The Hub Controller 34 includes logic to control host-to-hub communications. Hub-specific status and control commands permit the HOST to configure the SShub 8 and control the individual downstream ports. Once configured the Hub Controller 34 operates in accordance with the super-speed and high-speed configuration of the ports. In FIGS. 1 and 2 the ports are configured into four super-speed and seven high-speed ports.

In this particular system the four real super-speed ports are 10, 12, 14, and 16 that are controlled by the SShub 8 via a Downstream Port State Machine 36. The Downstream Port State machine connects to the super-speed ports 10, 12, 14, and 16 but there are no electrical connections from the Downstream Port State Machine 36 to the physical ports 18, 20 and 22, and there are not connections from these three ports to any super-speed devices. In addition, there is logic in block 34 that responds to an upstream Host indicating there are additional three super-speed ports connected to the SShub 8. In this example those are ports 18, 20 and 22. These three ports, however, are "dummy" super-speed ports that are not active and are not connected to any downstream super-speed devices. In this application the three "dummy" super-speed ports 18, 20, and 22 are physically connected to the HShub 9 with no active connections to the SShub 8. As illustrated, the host 3 "sees" seven super-speed ports and a like number of seven (thus balanced) high-speed ports.

As mentioned above the Host's system software, via the hub controller 34, the state machine 20, and the USB connector 6 will "see" seven super-speed ports. The "dummy" super-speed ports serve two functions: They make the super-speed hub appear to have exactly as many "apparent" ports as the high-speed hub, which preserves the balance required by system software; and they allow the power-management semantics of all the ports (including the dummy ports) to be consistent.

The invention claimed is:

1. Universal Serial Bus (USB) system according to the Universal Serial Bus Specification, revision 3.0, the system comprising;
    an upstream path suitable for communicating with a host computer system;
    a downstream path to "n," number of super-speed USB ports and to "m" number of high-speed USB ports, wherein "n" is less than "m," the downstream path suitable for communicating with one or more USB devices;
    a hub between the upstream path and the downstream path;
    a hub controller that indicates to the host computer that there are "m" super-speed downstream USB ports, wherein there are "n" number of physical downstream super-speed USB ports, and where there are "m" minus "n" number of "dummy" USB ports.

2. The Universal Serial Bus system of claim 1 wherein the dummy USB ports are not connected to any physical downstream super-speed connectors or super-speed devices.

3. The Universal Serial Bus system of claim 1 wherein the hub comprises:
    a logic state machine that communicates with the upstream Host;
    a super-speed repeater/forwarder that communicates with the logic state machine;
    the hub controller that communicates with the super-speed repeater/forwarder, and with the super-speed repeater/forwarder to indicate that there are "m" number of super-speed USB ports.

4. The Universal Serial Bus system of claim 3 wherein the "dummy" super-speed USB ports will not report to the host that there are devices present on the "dummy" ports, and will respond to turning on power if the command is directed to a "dummy" USB port.

5. The Universal Serial Bus system of claim 3 further comprising a downstream logic state machine that communicates with the downstream ports.

6. A method for controlling a system built according to the Universal Serial Bus Specification, revision 3.0, the method comprising the steps of;
    communicating to a host computer system via an upstream path;
    providing a downstream path to a number, "n," of super-speed USB ports and a number, "m," of high-speed USB ports, wherein "n" is less than "m," the downstream paths suitable for communicating with USB ports;
    connecting a super-speed hub between upstream path the m number of downstream USB ports;
    responding to the host computer that there are "m" super-speed downstream ports, and wherein there are only "n" number of active downstream super-speed ports, and where there are "m" minus "n" number of "dummy" USB ports.

7. The method of claim 6 wherein the dummy USB ports are not connected to any physical downstream super-speed connectors or super-speed devices.

8. The method of claim 6 wherein the step of communicating with the host computer via the upstream path comprises the steps of:
    providing a logic state machine that communicates with the upstream HOST 3 and with the hub controller;
    providing a super-speed repeater/forwarder that communicates with the logic state machine; and
    communicating via a hub controller and the super-speed repeater/forwarder to indicate the host computer that there are "m" number of super-speed USB ports.

9. The method of claim 3 further comprising the step of turning on power to the port if the command is directed to a "dummy" USB port.

10. The method of claim 3 further comprising the step communicating with the downstream ports via a state machine.

* * * * *